United States Patent [19]
Ellis, Jr.

[11] Patent Number: 6,059,431
[45] Date of Patent: May 9, 2000

[54] WHEEL MOUNTED SAFETY LIGHT

[76] Inventor: Jesse Ellis, Jr., 25975 Peterman Ave., Hayward, Calif. 94545

[21] Appl. No.: 09/211,660

[22] Filed: Dec. 15, 1998

[51] Int. Cl.$^7$ ..................................................... B60Q 1/24
[52] U.S. Cl. ........................... 362/500; 362/191; 362/473
[58] Field of Search ..................................... 362/190, 191, 362/194, 195, 197, 473, 475, 476, 500; 340/432

[56] References Cited

U.S. PATENT DOCUMENTS

| | | | |
|---|---|---|---|
| 1,763,815 | 6/1930 | Pajeau | 362/197 |
| 2,132,063 | 10/1938 | Whaley | 362/197 |
| 2,334,442 | 11/1943 | Salimbene | 362/473 |
| 2,630,480 | 3/1953 | Johnson et al. | 340/432 |
| 2,788,763 | 4/1957 | Ries | 116/56 |
| 3,005,906 | 10/1961 | Butler, Jr. | 362/500 |
| 3,184,589 | 5/1965 | Gibbens | 362/197 |
| 4,099,222 | 7/1978 | Cornell et al. | 362/473 |
| 4,787,014 | 11/1988 | Wedder et al. | 362/473 |
| 5,128,840 | 7/1992 | Seki et al. | 362/473 |
| 5,357,238 | 10/1994 | Terada | 362/500 |

*Primary Examiner*—Alan Cariaso
*Attorney, Agent, or Firm*—Theodore J. Bielen, Jr.

[57] ABSTRACT

An illumination device mounted on a wheel powered by a pair of batteries. The device includes first and second containers which are angularly disposed relative to one another. An interconnection exists between the containers to permit electrical contact between the pair of batteries. The first and second containers fit snugly around the axle of the wheel and illuminate a lamp to project light.

10 Claims, 1 Drawing Sheet

WHEEL MOUNTED SAFETY LIGHT

BACKGROUND OF THE INVENTION

The present invention relates to a novel and useful illumination device mounted on a wheel.

Vehicles such as motorcycles, bicycles, scooters, and the like require lighting in night time conditions for safety and efficiency. In the past, lights have been mounted on a stationary portion of the vehicle next to the wheel. For example, U.S. Pat. Nos. 2,630,480, 2,788,763, and 4,099,222 describe this type of lighting system for bicycles.

U.S. Pat. No. 5,128,840 shows a bicycle luminaire which utilizes Wiegand Effect Technology which generate electricity through the movement of a wheel to a stationary light.

U.S. Pat. No. 4,787,014 describes a safety lighting device which is affixed to a mounting plate on a wheel rim. The light is directed radially from the wheel to provide a spectacular visual effect.

A compact illumination device capable of being mounted to a wheel for movement therewith would be a notable advance in the recreational vehicle field.

SUMMARY OF THE INVENTION

In accordance with the present invention a novel and useful illumination device mounted on a wheel powered by a pair of batteries herein provided.

The device utilizes a first container having a wall portion which forms an inner chamber to hold one of the batteries. The inner chamber also includes an aperture to permit the shining of light through the same by a lamp, which is also found in the first chamber of the first container. The first container may further be provided with a channel having an opening that communicates with the aperture of the first container and an opening which is smaller than the aperture of the first container.

The second container is also provided in the present invention and includes a wall portion having an inner chamber for containing the second battery. The second inner chamber holds the second battery at an angle relative to the first battery. By the same token, the first and second containers are angularly disposed relative to one another. Mounting means holds the first and second containers at least partially around the axle of the wheel. The first and second containers may communicate with one another to permit electrical connection between the first and second batteries. In fact, means is also provided for forming an electrical circuit between the lamp and such electrically connected first and second batteries. Thus, the illumination device of the present invention compactly fits around the axle of the wheel and is held thereto by mounting means. Light from the illumination device of the present invention is directed on the rim of the wheel and is easily viewed by persons apart from the vehicle carrying the illumination device of the present invention.

It may be apparent that a novel and useful illumination device mountable to a wheel of a vehicle is herein provided.

It is therefore an object of the present invention to provide an illumination device mounted to the wheel of a vehicle which is compact and capable of rotating with the wheel.

Another object of the present invention is to provide an illumination device mounted to the wheel of a vehicle which at least partially wraps around the axle of the wheel, thus providing a low profile configuration.

Another object of the present invention is to provide an illumination device mounted to the wheel of a vehicle which provides illumination such that the operator of the vehicle is easily seen in nighttime conditions.

A further object of the present invention is to provide an illumination device mounted to the wheel of a vehicle which is easily installed and removed, and uses conventional batteries and lamps.

Another object of the present invention is to provide an illumination device which increases the safety to the rider of a vehicle.

The invention possess other objects and advantages especially as concerns particular characteristics and features thereof which will become apparent as the specification continues.

For a better understanding of the invention reference is made to the following detailed description of the preferred embodiments thereof which should be taken in conjunction with the prior described drawings.

DETAILED DESCRIPTION OF THE PREFERRED EMBODIMENTS

Various aspects of the present invention will evolve from the following detailed description of the preferred embodiments thereof which should be taken in conjunction with the prior delineated drawings.

Figure 1:
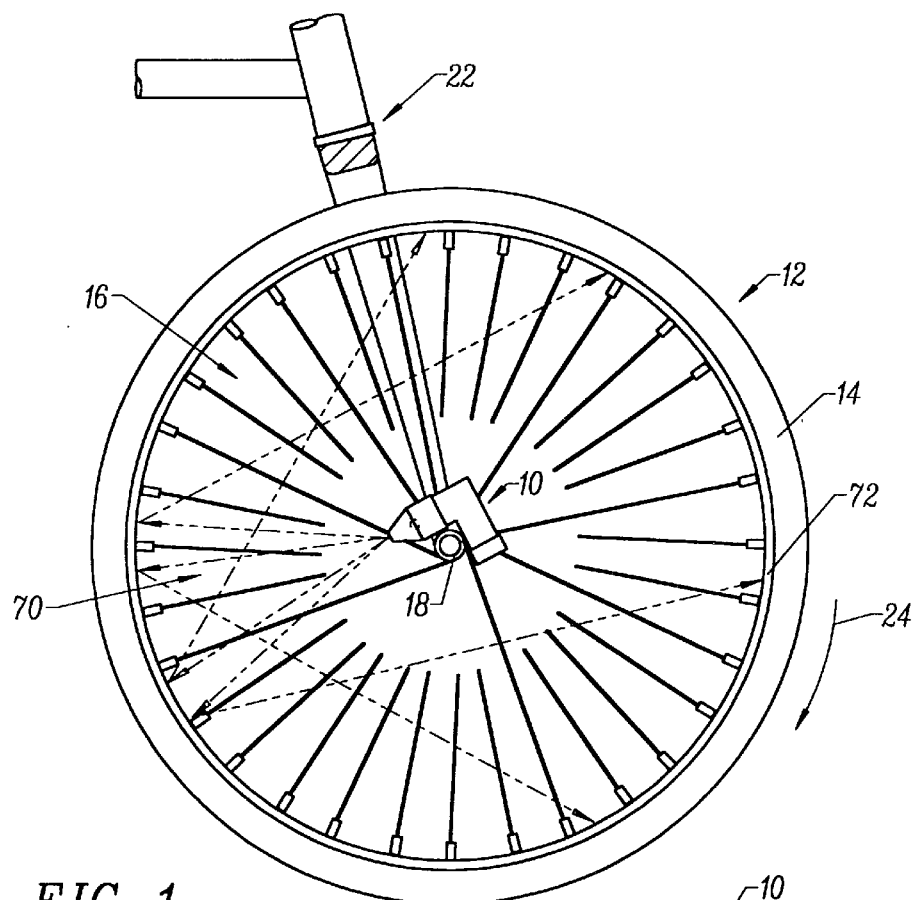
FIG. 1 is a side elevational view of the illumination device of the present invention in place on a vehicle wheel.

The invention as a whole is depicted in the drawings by reference character 10. The illumination device 10 is intended for use in conjunction with a vehicle wheel 12, including tire 14, plurality of spokes 16, and axle 18. Axle 18 revolves around axis 20. Stem and bar 22 represents the remainder of a bicycle, which is of conventional configuration and not fully depicted in FIG. 1. Wheel 12 rotates according to directional arrow 24 in the normal manner.

Figure 2:
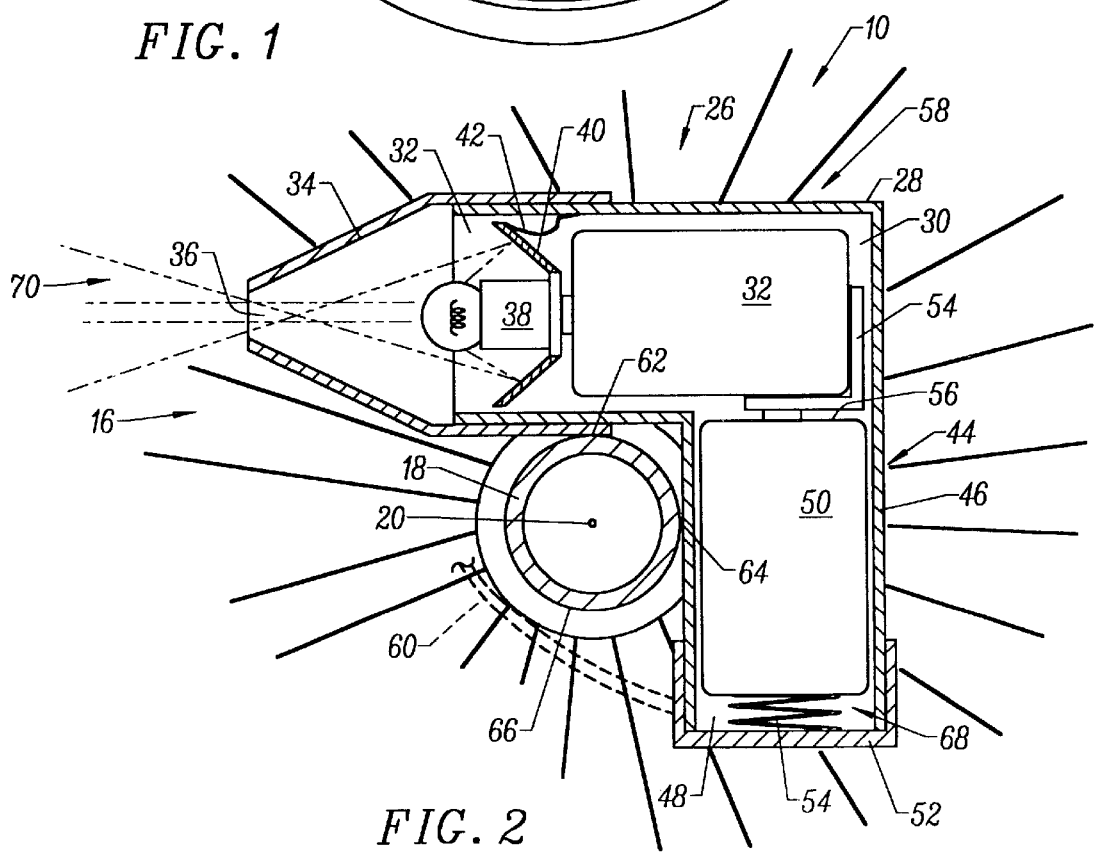
FIG. 2 is a sectional view of the illumination device and the axle of the wheel depicted in FIG. 1 in magnified configuration.

Turning to FIG. 2, it may be observed that illumination device 10 is shown in section for the sake of clarity. Illumination device 10 includes a first container 26 having a wall portion 28 forming an inner chamber 30. Inner chamber 30 is capable of containing or holding a battery 32, which is commercially available. In addition, first container 26 possesses an aperture 32. Aperture 32 extends into a channel 34 having an opening 36 which is smaller than aperture 32 as shown in FIG. 2. Channel 34 overlaps wall portion 28 of first container 26. Such contact may be frictional, threaded, and the like. In any case, channel 34 is removable from first container 26 to gain access to battery 32. In addition, a lamp and socket 38 is at least partially located in first container 26. Lamp also includes a reflector 40 which electrically conductive material such as metal. Alternatively, first container 26 may be constructed of non conductive material such as plastic, wood, paper, and the like and include electrically conductive strips, lines, and the like, to permit electrical connection between conductive reflector 40 and bridging electrical wire 42.

Second container 44 is also depicted in the drawings and possesses a wall portion 46 forming an inner chamber 48. Inner chamber 48 holds another battery 50. Removable cap permits access to battery 50 and also serves to aid in the electrical connection between battery 50 and conductive wall portion 46 of second container 44. Again, second container 44 may be formed of the same material as first container 26, hereinabove described. In any case, conductive spring 54 electrically connects second battery 50 to cap 52 and connected wall 46. L-shaped conductor 54 electrically links battery 32 to battery 50 within first and second containers and 44. It should be noted that second container 44 includes an aperture 56 permitting communication between inner chamber 48 of second container 44 and inner chamber 30 of first container 26. Of course, first and second containers 26 and 48 may be formed integrally or separately. As depicted in the drawings, first and second chambers 26 and 44 constitute one piece.

Mounting means 58 is also found in the present invention for holding first and second containers at least partially around axle 18. For example, mounting means 58 may take the form of simply wedging device 10 within plurality of spokes 16. In addition, a strap 60 or a multiplicity of straps (not shown) may be used to hold device 10 to axle 18. Other mounting means such as screws, adhesives, magnets, and the like may be employed in this regard. It may be observed that device 10 contacts axle 18 in two places 62 and 64, which are separated radially about the outer surface 66 of axle 18. Thus, mounting means 58 at least partially holds illumination device 10 around axle 18 of wheel 12.

Means 68 is also provided for forming an electrical circuit between lamp and socket 38, battery 32, and battery 50. As prior described, lamp 38 electrically connects to conductive reflector 40, which is connected to electrically conductive wall 28 through wire 42. Electrically conductive spring 54 contacts cap 52, electrically connected to wall 46 of second container 44. Finally, L-shaped conductor 54 electrically interconnects batteries 32 and 50 to form a circuit. Although not depicted in the drawings, wire 42 may be interrupted with a switch to turn illumination device on and off as desired. Of course, alternate means may provide this function such as moving lamp and socket 38 inwardly and outwardly with the movement of channel 34 and the like.

In operation, illumination device 10 is loaded with batteries 32 and 50 and fastened to axle 18 of wheel 12 by mounting means 58. Means 68 forming the circuit is activated and permits the projection of light, indicated by multiplicity of ray lines 70, outwardly through opening 36 of channel 34. Such ray lines, further depicted in FIG. 1, indicate that light is reflected off tire rim 72 in various directions in the plane of wheel 12, as well as outwardly therefrom. The net effect is that the user of the vehicle associated with wheel 12 is easily seen at night through the rotation of wheel 12 and the reflection of the light rays 70 from illumination device 10 along rim 72 and outwardly therefrom.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. An illumination device mounted on a wheel powered by first and second batteries, comprising;

a. a first container, said first container including a wall portion forming a first inner chamber, said wall portion of said first container further including an aperture, said first inner chamber holding the first battery;

b. a second container, said second container including a wall portion having a second inner chamber, the second inner chamber holding the second battery at an angle relative to the first battery;

c. a lamp, said lamp electronically connected to the first battery and projecting light through the aperture of said first inner chamber;

d. means for forming an electrical circuit between said lamp and the electronically connected first battery and the second battery; and e. mounting means for holding said first and second containers at least partially around the axle of the wheel.

2. The device of claim 1 in which said first inner chamber interconnects with said second inner chamber.

3. The device of claim 2 in which said wall portion of said first container is contiguous with said wall portion of said second container.

4. The device of claim 1 in which said circuit means includes an angled conductor electronically connecting the first and second batteries.

5. The device of claim 4 in which said first inner chamber interconnects with said second inner chamber.

6. The device of claim 5 in which said wall portion of said first container is contiguous with said wall portion of said second container.

7. The device of claim 1 which additionally comprises a channel communicating with said aperture of said first container and possessing an opening smaller than said aperture of said first container, said lamp projecting light through said channel opening.

8. The device of claim 7 in which said circuit means includes an angled conductor electronically connecting the first and second batteries.

9. The device of claim 8 in which said first inner chamber interconnects with said second inner chamber.

10. The device of claim 9 in which said wall portion of said first container is contiguous with said wall portion of said second container.

* * * * *